United States Patent [19]
Sasaki et al.

[11] Patent Number: 5,735,183
[45] Date of Patent: Apr. 7, 1998

[54] POWER SCREWDRIVER AND CLUTCH MECHANISM USED THEREIN

[75] Inventors: Yasuo Sasaki; Mitsuo Ogura; Yuuichi Satou, all of Hitachinaka, Japan

[73] Assignee: Hitachi Koki Co., Ltd., Tokyo, Japan

[21] Appl. No.: 594,712

[22] Filed: Jan. 31, 1996

[30] Foreign Application Priority Data

Jan. 31, 1995 [JP] Japan .................................. 7-014374

[51] Int. Cl.$^6$ ................................................ B25B 23/157
[52] U.S. Cl. ............................ 81/473; 81/480; 81/477; 192/816
[58] Field of Search ............................ 81/429, 467, 473, 81/477, 480, 58.3, 58; 192/81 C

[56] References Cited

U.S. PATENT DOCUMENTS 4,655,103  4/1987  Schreiber et al. .

FOREIGN PATENT DOCUMENTS 0195853   11/1989  European Pat. Off. .
35 10605 C2  2/1985  Germany .
3-5952  1/1991  Japan .

*Primary Examiner*—D. S. Meislin
*Attorney, Agent, or Firm*—Lowe, Price, LeBlanc & Becker

[57] ABSTRACT

A power screw driver includes a clutch mechanism composed of a coiled clutch spring so designed as to entangle a drive shaft member and an output shaft member to connect them together, thereby enabling the drive and output shaft members to rotate in unison. By the use of the coiled clutch spring, the clutch engaging operation is achieved smoothly and silently without accompanying impact blow or shock, thereby securing reliable transmission of a torque from the drive shaft member to the output shaft member. The coiled clutch spring may be activated only when the drive shaft member is rotating in the forward direction, in which instance a one-way clutch is used to undertake transmission of the torque when the drive shaft member is rotating in the reverse direction. As an alternative, a single clutch spring may be used to undertake transmission of the torque in the forward and reverse rotational directions. Alternatively, two coiled clutch springs each provided for one rotational direction may be used.

30 Claims, 11 Drawing Sheets

POWER SCREWDRIVER AND CLUTCH MECHANISM USED THEREIN

BACKGROUND OF THE INVENTION

1. Field of the Invention

The present invention relates generally to power screwdrivers, and more particularly to a power screwdriver of the type wherein application of a rotational force or torque to a screw is interrupted at a predetermined tightening depth to secure a reliable stop or termination of screw tightening operation, and a clutch mechanism suitable for use in such screwdriver.

2. Description of the Prior Art

Some conventional electric screwdrivers include a clutch mechanism which is operative to out off transmission of a power from a drive shaft to an output shaft when the torque on a screw being tightened exceeds a predetermined value. However, in the case where an article to which screws are tightened (hereinafter referred to as "tightened material") is made of a very soft material such as a plaster board, only a gentle or negligible torque change takes place during the screw tightening operation. Accordingly, for the screwdrivers of the type having a clutch operable depending on a torque exerted on screw being tightened, it is almost impossible to stop the feed or driving of the screw at a desired tightening depth. To deal with this difficulty, a different type of electric screwdriver is used, which includes a stopper mounted on a portion of the body and adjustable in position in the axial direction of the body to ensure that during the screw tightening operation, a clutch is automatically disengaged when the screwdriver body is forced toward the tightened material until the stopper comes in contact with the tightened material.

One example of such screwdriver, that is, one having a clutch adapted to be disengaged depending on a screw feed distance is disclosed in Japanese Patent Publication No. 3-5952. The disclosed screwdriver is provided with an intermediate toothed clutch element or member disposed between a toothed clutch member of a drive portion or unit and a toothed clutch member mounted on an output shaft on which a driver bit is held. When a predetermined screw feed distance is reached, the clutch member of the drive unit and the intermediate clutch member are disengaged to out of transmission of a torque therebetween. After the torque transmission is interrupted, the intermediate clutch member and the drive unit clutch member are spaced apart by a spring against reengagement to avoid generation of striking noise.

In the power screwdriver described in the above-specified Japanese publication, all of the three clutches members are provided with teeth. Since the toothed intermediate clutch member is brought into meshing engagement with the toothed clutch member of the drive shaft while rotating at a high speed, such as 5,000 rpm, under the no-load condition, a great striking noise and a shock or impact force are generated until teeth on the two clutch members are mutually engaged. Furthermore, the teeth on the clutch members have a trapezoidal shape in axial cross section and, hence, an impact force acting on the teeth has a component force tending to separate the teeth on the intermediate clutch member from the teeth on the clutch member on the drive shaft. It is, therefore, necessary to apply a great thrusting force to initiate the screw tightening operation against the resistance of such component force. Furthermore, in the case where the tightened material has a resiliency, the output shalt is liable to oscillate in the axial direction, resulting in a great striking noise generated due to reengagement between the teeth on the intermediate clutch member and the teeth on the drive shaft clutch member.

SUMMARY OF THE INVENTION

With the foregoing drawbacks of the prior art in view, it is an object of the present invention to provide a power screwdriver which is capable of operating smoothly and silently with no striking blow or shook produced when a clutch is engaged and disengaged according to the screw feed distance, and can be handled easily with a small axial thrusting force required of the operator to initiate the clutch engaging operation, and alto to provide a clutch mechanism which is particularly suitable for use in such power screwdriver.

To attain the foregoing object, a clutch mechanism according to the present invention has no reliance upon the use of teethed clutch members for the connection and disconnection between a drive shaft and an output shaft, but includes a coil spring disposed concentrically with the drive shaft and the output shaft and movable into binding engagement with these shafts to transmit a rotational force or torque from the drive shaft to the output shaft via the coil spring.

According to a first aspect of the present invention, there is provided a power screwdriver of the type including a drive shaft member for transmitting a power from a drive unit, an axially movably supported output shaft member holding a bit, and a compression spring urging the output shaft member and the drive shaft member away from each other, in which transmission of a rotational force from the drive shaft member to the output shaft member is interrupted according to a predetermined axial displacement of the output shaft member relative to the drive shaft member, wherein the improvement comprises: a coiled clutch spring coaxial with the drive shaft member and the output shaft member and extending spirally over and along respective cylindrical surfaces of the drive shaft member and the output shaft member, the clutch spring having a portion firmly secured to one of the output shaft member and the drive shaft member; and means on the other of the output shaft member and the drive shaft member for locking a second portion of the clutch spring in response to the axial displacement of the output shaft member.

According to a second aspect of the present invention, there is provided a power screwdriver of the type including a drive unit, a drive shaft member rotatable by the drive unit, an output shaft member capable of holding a bit, rotatable about its own axis and movable in the axial direction according to a screw tightening depth, a compression spring urging the output shaft member and the drive shaft member away from each other, clutch means for enabling and interrupting transmission of a rotational force from the drive shaft member to the output shaft member, and a housing containing the drive unit, the drive shaft member, the output shaft member, the compression spring and the clutch means, wherein the improvement comprises: the drive shaft member and the output shaft member being coaxial with each other and having respective sleeves; and the clutch means including a coil spring engageable with respective outer peripheral surfaces of the sleeves of the drive shaft member and the output shaft member, means for firmly securing one end of the coil spring to one of the drive shaft member and the output shaft member, and locking means for locking the other end of the coil spring to the other of the drive shaft member and the output shaft member when the drive shaft member approaches the output shaft member against the force of the compression spring as the housing is thrust toward a material to which a screw is tightened.

According to a third aspect of the present invention, there is provided a clutch mechanism comprising: a drive shaft member rotatable by a drive unit and having a first cylindrical sleeve; an output shaft member coaxial with the drive shaft member, rotatable about its own axis, movable in the axial direction toward and away from the drive shaft member, and having a second cylindrical sleeve substantially aligned with the first sleeve; a compression spring urging the drive shaft member and the output shaft member away from each other; a coil spring disposed along respective outer peripheral surfaces or respective inner peripheral surfaces of the first and second sleeves and having one end secured to one of the drive shaft member and the output shaft member; means for causing the drive shaft member and the output shaft member to move toward each other against the force of the compression coil spring for transmitting a rotational force from the drive shaft member to the output shaft member; and locking means for temporarily locking the other end of the coil spring to the other of the first and second sleeves when the distance between the drive shaft member and the output shaft member falls below a predetermined value.

With the construction described above, the power screwdriver is capable of operating silently without generating striking noise and shock during the clutch engaging and disengaging operations, can be handled easily with a small thrusting force required of the operator to initiate the clutch engaging operation, and is able to provide a uniform screw tightening depth (screw feed distance).

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

The present invention will be described below in greater detail with reference to certain preferred embodiments shown in the accompanying sheets of drawings.

Figure 1:
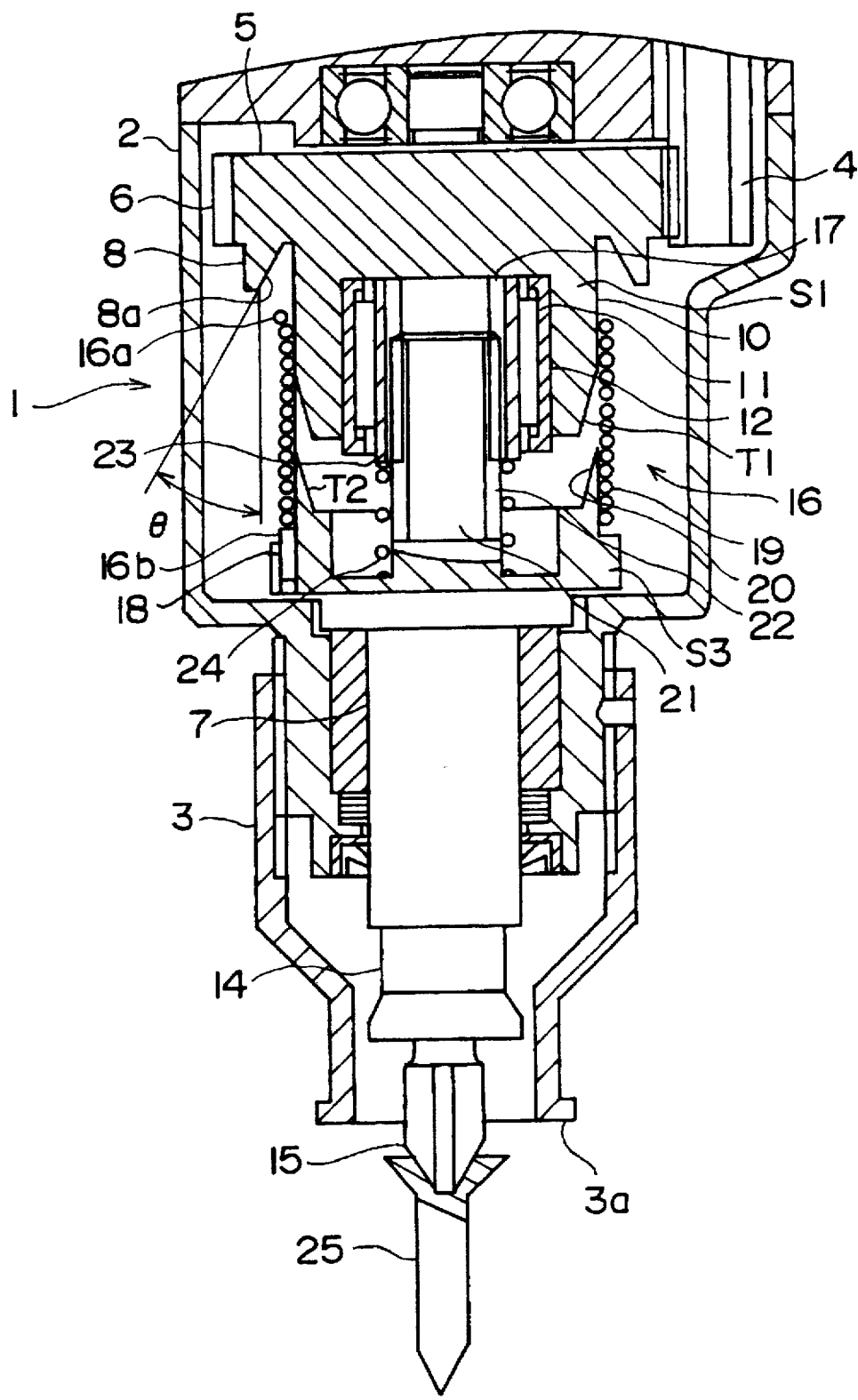
FIG. 1 is a longitudinal cross-sectional view, with parts omitted for clarity, of a first embodiment of a power screwdriver according to the present invention.

FIG. 1 shows in close section a first embodiment of a power screwdriver according to the present invention. The power screwdriver 1 includes a housing 2 and a stopper sleeve 3 threaded over a front end (lower end in FIG. 1) of the housing 2. The stopper sleeve 3, as it is turned or rotated, is axially displaced relative to the housing 2, so that a screw feed distance (screw tightening depth) can be adjusted in a manner described below. The housing 2 contains a pinion 4 attached to the output shaft of a motor (not shown), and a drive shaft member 5 rotatably supported in the housing 2 and having formed on its outer periphery a gear 6 held in mesh with the pinion 4.

The drive shaft member 5 includes an annular shoe 8 located below the gear 6, that is, at a portion facing an output shaft member 7. The shoe 8 has an inside wall surface 8a sloping like a taper wall flaring toward the output shaft member 7. More specifically, the sloped inside wall surface 8a is complementary in contour to the shape of a portion of an outer peripheral surface of a cone having an axis aligned with a central axis of the drive shaft member 5. The inside wall surface 8a defines jointly with the central axis of the drive shaft member 5 an inclination angle or taper angle θ. Disposed concentrically in the shoe 8 is a sleeve (cylinder) S1 extending toward the output shaft member 7. The drive shaft member 5, the gear 6, the shoe 8 and the sleeve S1 are formed integrally with each other as a single component part. The sleeve S1 is has an outer peripheral surface forming a drive shaft cylindrical outside surface 10 and an inner peripheral surface forming a drive shaft cylindrical inside surface 11. The drive shaft cylindrical inside surface 11 has defined therein an internal cylindrical space or hole in which a roller type one-way clutch 12 is firmly received. The drive shaft cylindrical outside surface 10 has an end portion facing the output shaft member 7 and so configurated as to form a taper portion T1 having an outside diameter gradually decreasing toward the tip end.

Figure 2:
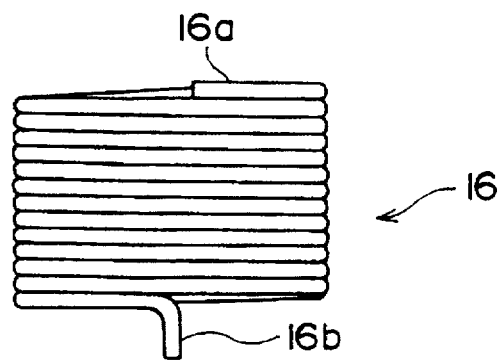
FIG. 2 is a front elevational view of a clutch spring used in the first embodiment.

The output shaft member 7 has a front end portion 14 so constructed as to enable attachment and detachment of a bit 15 relative to the front end portion 14. The output shaft member 7 includes an annular portion or sleeve S3 having an outer peripheral surface forming an output shaft cylindrical outside surface 19, an inner peripheral surface forming an output shaft cylindrical inside surface 20, and an inside surface (not designated) contiguous to the output shaft cylindrical inside surface 20. The output shaft member 7 has, formed in its outer peripheral portion facing the drive shaft member 5, i.e., in the output shaft cylindrical outside surface 19, an axial groove 18 in which one end 16b of a clutch spring 16, described later with reference to FIG. 2, is permanently locked. The output shaft cylindrical inside surface 20 has a sloped surface portion, namely a taper portion T2 having an inside diameter gradually decreasing from an end facing the drive shaft member toward the bit 15. The taper angle or angle of inclination of the taper portion T2 is the same as that of the taper portion T1.

The output shaft member 7 has a guide shaft disposed concentrically in the sleeve S3 and extending toward the drive shaft member 5. The guide shaft 21 has on its outer peripheral surface a plurality of splines 22. The one-way clutch 12 has an inner peripheral surface firmly fitted with the outer peripheral surface of a hollow cylindrical slider 23 having, in its inner peripheral surface, a plurality of guide splines 17 coupled with the splines 22 on the guide shaft 21. The slider 23 is urged by a compression spring 24 toward the drive shaft 5 (upward in FIG. 1). The clutch spring 15 as a whole is in the form of a coil spring formed from a wire having a circular cross section.

Figure 3:
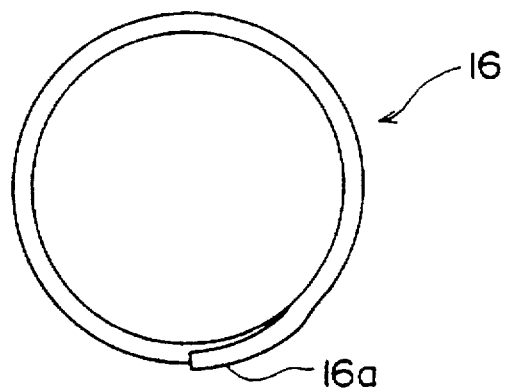
FIG. 3 is a plan view showing an upper end of the clutch spring used in the first embodiment.

As shown in FIG. 2, the clutch spring 16 is composed of a tightly wound left hand coil spring and, hence, rotation of the drive shaft member 5 in the forward direction (right-hand or clockwise direction) tightens (or reduces the diameter of) the clutch spring 18. The one end (lower end in FIGS. 1 and 2) 16b of the clutch spring 16 projects in an axial outward direction. The lower end 16b of the clutch spring 16 is inserted in the axial groove 18 in the output shaft member 7 and firmly secured to the output shaft member 7. The clutch spring 16 has a lower portion fitted around the output shaft cylindrical outside surface 19 with an appropriate interference provided therebetween. On the other hand, an upper portion of the clutch spring 10 is loosely fitted around the drive shaft cylindrical outside surface 10 of the drive shaft member 5 with a clearance defined therebetween. The upper end 16a of the clutch spring 16 is slightly distorted or swelled in a radial outward direction and hence has a greater diameter than the rest of the clutch spring 16, as shown in FIG. 3. The upper end 16a of the clutch spring 16 is not like the axially projecting lower end 16b shown in FIG. 2 but has an outside diameter larger than the rest of the clutch spring 16, as shown in FIG. 3.

The power screwdriver 1 according to the first embodiment of the foregoing construction will operates as follows.

After the head of a screw 25 is fitted with the tip end of the bit 15, the non-illustrated motor is energized. The output from motor is transmitted from the pinion 4 to the gear 6 and rotates the drive shaft member 5 in the forward or right-hand direction. In this instance, clutch spring 16 is slightly spaced from the drive shaft cylindrical outside surface 10, so a rotational force or torque is not transmitted from the drive shaft member 5 to the output shaft member 7. Form this condition, an operator of the screwdriver 1 starts thrusting the body of the screwdriver 1 toward a tightened material (not shown), thereby forcing the screw 25 against the tightened material. As a result of this thrusting operation, the output shaft member 7 is displaced toward the drive sheet member 5 against the force of the compression spring 24. As the thrusting continues, the output shaft member 7 is brought to the position shown in FIG. 4. At this time, the front end 3a of the stopper sleeve 3 is ahead of the tightened material.

In this instance, the upper end 16a of the clutch spring 16 comes into contest with the inside wall surface 8a of the shoe 8 whereupon the upper end 16a of the clutch spring 16 tends to rotate together with the rotating drive shaft member 5 due to a friction acting between the upper end 16a and the inside wall surface 8a of the shoe 8. At the same time, by virtue of 8 component force created due to the inside wall surface 8a tapering at the angle θ, the upper end 16a of the clutch spring 16 is forced against the drive shaft cylindrical outside surface 10 and then gripped between the inside wall surface 8a of the shoe 8 and the drive shaft cylindrical outside surface 10 both of which are rotating. The thus gripped upper portion of the clutch spring 16 slightly reduces in its inside diameter, and an upper portion of the clutch spring 16 firmly winds around and thereby grips the drive shaft cylindrical outside surface 10, and starts rotating together with the drive shaft member 5. Thus, the rotational force or torque is transmitted from the drive shaft member 5 to the output shalt member 7. While the load is transmitted in the manner described above, the taper portion T1 of the drive shaft member 5 and the taper portion T2 Of the output shaft member 7 are closely fitted with each other.

Figure 4:
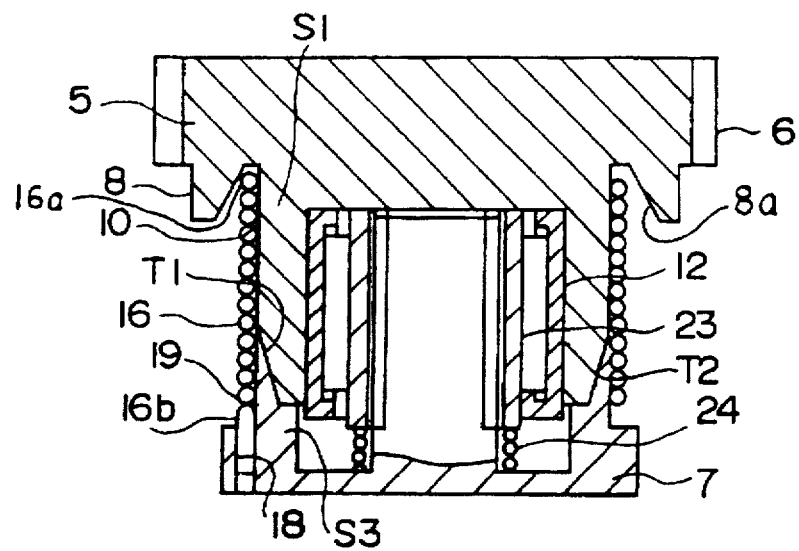
FIG. 4 is a fragmentary cross-sectional view showing the condition in which the first embodiment is in the screw-tightening operation mode.

The clutch spring 16 while being tightened upon co-rotation with the drive shaft member 5 tends to bite into the interface between the drive shaft cylindrical outside surface 10 and the output shaft cylindrical outside surface 19. However, since the taper portion T1 of the drive shaft member 5 and the taper portion T2 of the output shaft member 7 are closely fitted together, as shown in FIG. 4, biting of the clutch spring 16 does not take place with the result that the clutch spring 16 is protected against plastic deformation. While the output shaft member 7 is rotating continuously, the screw 23 is progressively fed or driven into the tightened material, and when a predetermined feed distance (tightening depth) is reached, the stopper sleeve 3 comes into abutment with the tightened material whereupon the output shaft member 7 is slightly displaced downwardly in FIGS. 1 and 2 by the force of the compression spring 24. Thus, the clutch spring 16 is released from the thrusting force and disengages from the drive shaft cylindrical outside surface 10, thereby terminating the screw tightening operation. Under such condition, even if the clutch spring 16 again makes a contact with the inside wall surface 8a of the shoe 8, only a slip sound is generated. Thus, the operation noise of the screwdriver can be greatly reduced.

In the first embodiment, the inclination angle (taper angle) θ of the inside wall surface 8a of the shoe 8 is 30 degrees. As the inclination angle θ decreases, the required initial thrusting force decreases but the difficulty in releasing the upper end 16a of the clutch spring 16 from the inside wall surface 8a of the shoe 8 increases. Conversely, the grater the inclination angle θ, the easier the detachment of the clutch spring upper end 16a from the shoe's inside wall surface 8a but the more initial thrusting force it requires. The inclination angle θ preferably ranges from 5 degrees to 70 degrees.

At the time of reverse rotation (left-hand rotation or rotation in the counterclockwise direction), owing to the action of the one-way clutch 12, a rotational force of the drive shaft member 5 produced by rotation of the motor is immediately transmitted via the slider 23 and the guide shaft 21 to the output shaft member 7, so that a screw loosening operation can be started immediately. This arrangement provides a great reduction in working efficiency as compared to a power screwdriver equipped with conventional toothed clutch members in which in order to engage the toothed clutch members, the stopper sleeve 3 must be lifted up before the tip of the bit is engaged with the head of a tightened screw. The clutch spring 16 may be formed from a wire having a rectangular or an oval cross section. The upper end 16a of the clutch spring 16 which is brought into contact with the shoe 8 is slightly distorted or swelled radially outwardly so as to have a larger diameter than the rest. However, the configuration of the upper end 16a should by no means be limited to one in the illustrated embodiment but may include any other variation as long as the configuration employed enables the upper end 16a to act upon the drive shaft cylindrical outside surface 10 with a smaller force exerted thereon than as exerted from the rest of the clutch spring 16. The spline coupling 17, 22 may be replaced by a key coupling or a ball spline coupling.

Figure 5:
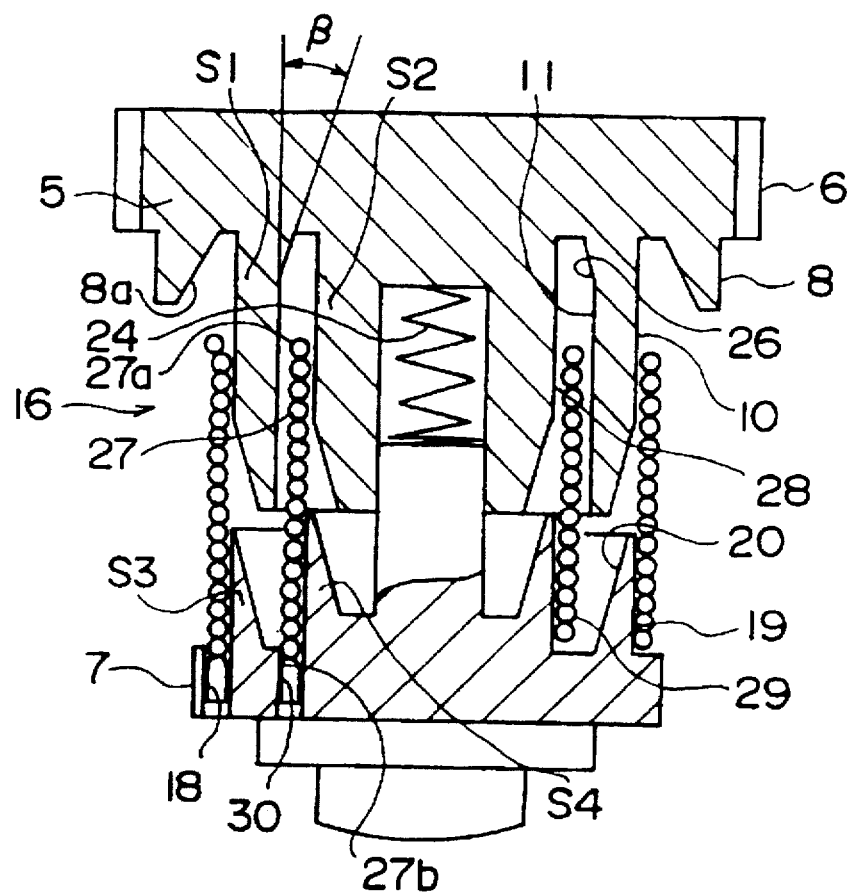
FIG. 5 is a fragmentary cross-sectional view showing a second embodiment of the power screwdriver according to the present invention.

FIG. 5 shows in cross section a second embodiment of the power screwdriver according to the present invention. Description given below will be limited to differences from the first embodiment previously described. In the second embodiment, a reverse rotation shoe 26 and a reverse rotation clutch spring 27 are provided in place of the one-way clutch 12 in the first embodiment. To this end, a drive shaft member 5 and an output shaft member 7 each have a concentrical double hollow structure and they are disposed in coaxial relation to a clutch spring 16 in the like manner as the first embodiment, and also to the reverse rotation clutch spring 27. In terms of the shape and configuration, the drive shaft member 5 and the output shaft member 7 in the second embodiment have many points common to, but still differ from, those in the first embodiment, however, for purposes of illustration, like or corresponding parts are designated by the identical reference characters throughout the several views. The same may be said of each of the following embodiments.

The drive shaft member 5 in the second embodiment includes a forward rotation shoe 8 and a drive shaft outer cylindrical surface 10 disposed below a gear 5 in the same manner as the first embodiment. Extending concentrically with and located inside the drive shaft cylindrical outside surface 10 is a drive shaft cylindrical inside surface 11 which defines or forms, jointly with the drive shaft cylindrical outside surface 10, an annular wall consisting an outer sleeve S1. The reverse rotation shoe 26 is located at an upper portion (in FIG. 5) of the drive shaft cylindrical inside surface 11 and faced in a radial inward direction. Extending concentrically with and located inside the reverse rotation shoe 26 is a reverse rotation drive shaft member cylindrical outside surface 28 (outer peripheral surface of an inner sleeve S2) for being griped by the reverse rotation clutch spring 27 while the clutch spring 27 is in action in the reverse rotation mode. The output shaft member 7 has an axial groove 18 permanently locking therein the lower end 16b of a forward rotation clutch spring 16, an output shaft cylindrical outside surface 19 and an output shaft cylindrical inside surface 20 in the same manner as the first embodiment. The output shaft member 7 further includes a reverse rotation output shaft cylindrical outside surface 29 (outer peripheral surface of an inner sleeve S4) confronting the output shaft cylindrical inside surface 20 and adapted to be gripped by the reverse rotation clutch spring 27 in the reverse rotation mode, and a second axial groove 30 in which a lower end 27b of the reverse rotation clutch spring 27 is permanently locked.

Figure 6:
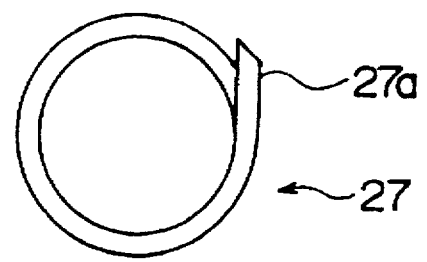
FIG. 6 is a plan view showing the upper end of a clutch spring used in the second embodiment.

The reverse rotation clutch spring 27 has a winding direction opposite to that of the forward rotation clutch spring 16 and, hence, is composed of a tightly wound right hand coil spring. The clutch spring 27 has an upper end 27a projecting in a radially outward direction, as shown in FIG. 6.

In the operation of the power screwdriver of the foregoing construction and in the forward rotation mode, in particular, a screw is attached to a bit (neither shown but both identical to those shown in FIG. 1) of the screwdriver, and after a non-illustrated motor is rotated, the screw is forced against a tightened material. In this operation mode, the clutch spring 16 is caused by the shoe 8 to become tighten and thereby grips the drive shaft cylindrical outside surface 10, thereby transmitting a rotational force from the drive shaft member 5 to the output shaft member 7. During that time, the upper end 27a of the reverse rotation clutch spring 27 is brought into contact with the surface of the reverse rotation shoe 26 and, by virtue of a component force created due to the surface of the reverse rotation shoe 26 tapering at an angle of β, the upper end 27a of the reverse rotation clutch spring 27 is urged against the reverse rotation drive shaft cylindrical outside surface 28. However, since the wire forming the reverse rotation clutch spring 27 is wound or coiled in the right hand direction as shown in FIG. 6 which is the same direction as the rotation of the inner sleeve S2, the reverse rotation clutch spring 27, upon contact with the reverse rotation drive shaft cylindrical outside surface 28 (outer peripheral surface) of the sleeve S2 while rotating in the forward direction (right-hand rotation), is subjected to a force tending to radially expand and hence loosen the reverse rotation clutch spring 27. While the drive shaft member 5 is rotating in the forward direction, the reverse rotation clutch spring 27 does not take part in the transmission of a rotational force or torque from drive shaft member 5 to the output shaft member 7 and has no effect on the screw tightening operation.

On the other hand, while the drive shaft member 5 is rotating in the reverse direction, the upper end 27a of the reverse rotation clutch spring 27 tightly winds around and hence grips the reverse rotation drive shaft cylindrical outside surface 28, thereby transmitting the rotational force or torque from the drive shaft member 5 to the output shaft member 7. In this instance, however, for the same reason as discussed above, the clutch sprang 16 and the shoe 8 provided exclusively for the forward rotation do not take part in the torque transmission work. Thus, they have no effect on the screw loosening operation achieved in the reverse rotation mode. The inclination angle (taper angle) β of the reverse rotation shoe 26 preferably ranges from 5 to 70 degrees in the same way as the inclination angle (taper angle) θ of the shoe 8. A wire from which the reverse rotation clutch spring 27 is formed may have a rectangular or en oval cross section.

Figure 7:
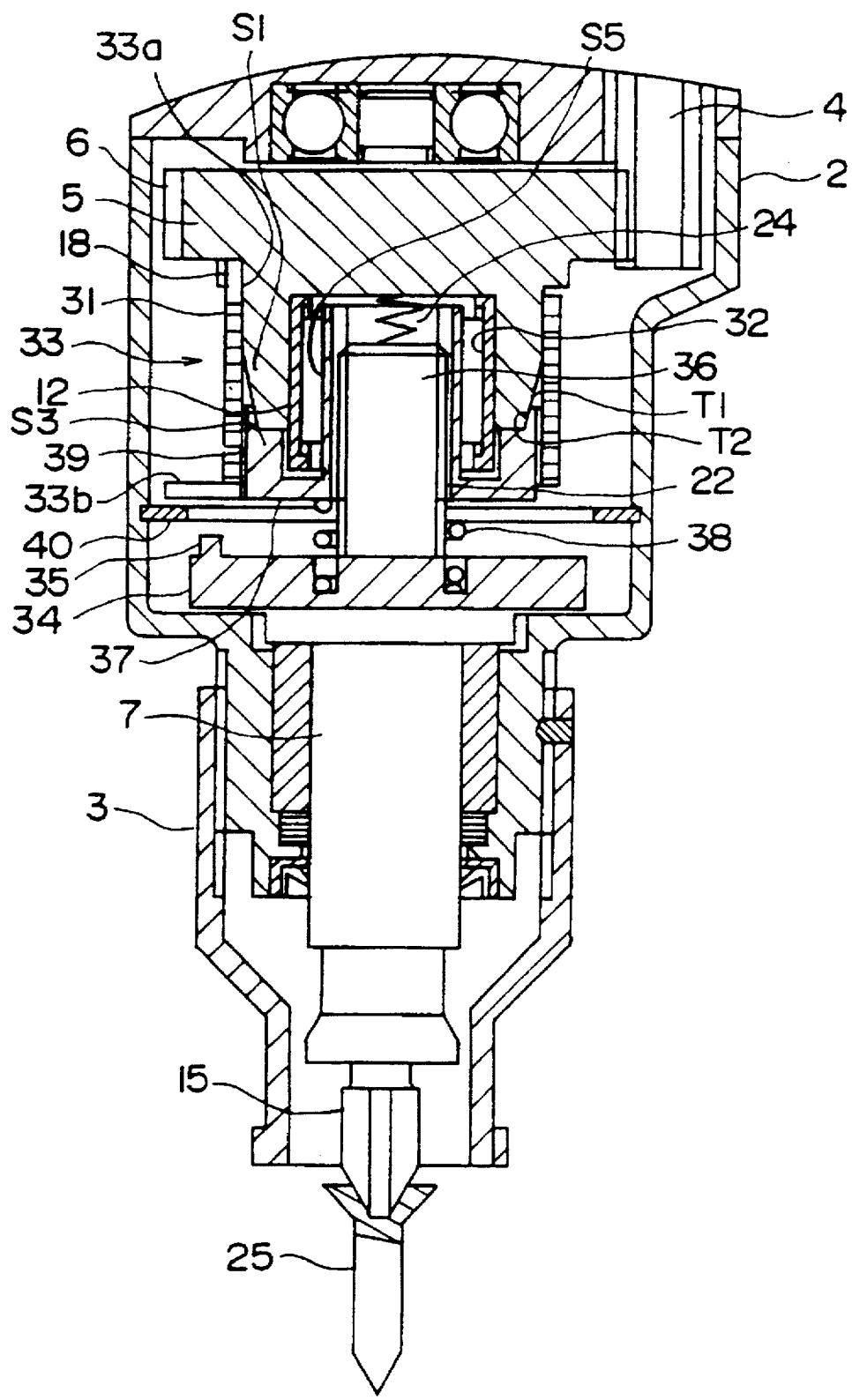
FIG. 7 is a fragmentary cross-sectional view, with parts omitted for clarity, of a third embodiment of the power screwdriver according to the present invention.

FIG. 7 shows in cross section a third embodiment of the power screwdriver according to the present invention. A drive shaft member 5 includes a sleeve S1 disposed below (as viewed in the same figure) a gear 6 and extending downwardly toward an output shaft member 7. The sleeve S1 has an outer peripheral surface forming an output shaft cylindrical outside surface 31 including a taper portion T1 gradually decreasing in outside diameter toward the output shaft member 7. The inner peripheral surface of the sleeve S1 forms a drive shaft cylindrical inside surface 32 and is fitted with the outer peripheral surface of a one-way clutch 12. The drive shaft cylindrical outside surface 31 has an upper end portion formed into an axial groove 18 in which an axially projecting upper end 33a of a clutch spring 33 is permanently locked. The output shaft member 7 has a circular flange 34 and a projection 35 disposed on one surface of the flange 34 facing the drive shaft member 5. The output shaft member 7 further includes a guide shaft 36 coaxial with the sleeve S1 of the drive shaft member 5 and extending toward the drive shaft member 5. The guide shaft 36 has on its outer peripheral surface a plurality of splines 22.

Figure 8:
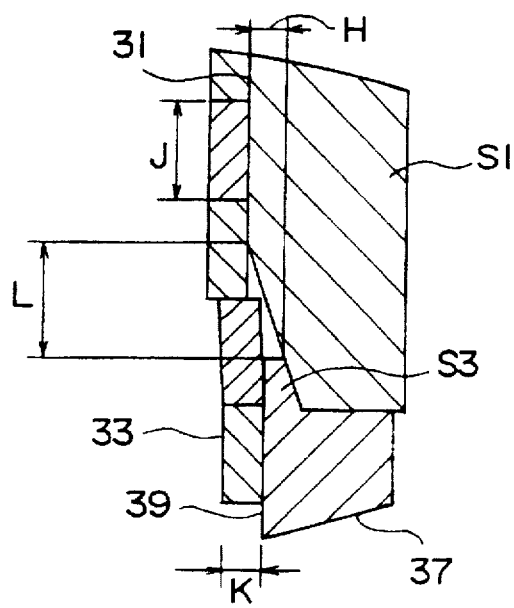
FIG. 8 is an enlarged fragmentary cross-sectional view of a portion of the third embodiment.

A power transmission member 37 includes a inner cylindrical sleeve S5 received between the guide shaft 36 and the one-way clutch 12, and a second or outer cylindrical sleeve S3 concentrical with the sleeve S5 and disposed radially outwardly of the sleeve S5. The inner sleeve S5 has an inner peripheral surface connected by a spline coupling to the guide shaft 36, and an outer peripheral surface engaged with a central hole in the one-way clutch 12. The outer sleeve S3 of the power transmission member 37 has an outside diameter which is slightly smaller than the outside diameter of the sleeve S1 of the drive shaft member 5, as shown in FIG. 8. The inner peripheral surface of the sleeve S3 has a taper portion T1 complementary in contour to the shape of a taper portion T2 of the sleeve S1 and hence the taper portions T1 and T2 have the same inclination angle (taper angle).

The power transmission member 37 is normally urged toward the drive shaft member 5 by means of a compression spring 38. The compression spring 38 has a small spring constant so that the taper portion T1 of the drive shaft cylindrical outside surface 31 and the taper portion T2 of the power transmission member 37 are normally held in coaxial fitted engagement with each other. The drive shaft cylindrical outside surface 31 and an outer peripheral surface 39 of the sleeve S3 of the power transmission member 37 are so designed as to jointly form therebetween a stop having a height H or an extent in the diametrical direction, and a length L or an extent in the axial direction, as shown in FIG. 8. The axial length L is preferably greater than the size or dimension J of the wire of the clutch spring 33 as measured along the axis of the clutch spring 33. The diametrical height H should fall within a range in which no plastic deformation of the clutch spring 33 is caused, and preferably it is not less than one-third the thickness K of the wire of the clutch spring 33. The clutch spring 33 is formed from a wire having a rectangular cross section and wound into a tightly would left hand coil spring. An upper end 33a of the clutch spring 33 is locked in the axial groove 18, and an upper portion of the clutch spring 33 is tightly fitted with the drive shaft cylindrical outside surface 31. On the other hand, due to the difference in outside diameter between the sleeve S3 and the sleeve S1, a lower portion of the clutch spring 33 provides a clearance between itself and the outer peripheral surface 39 of the sleeve S3. The lower end 33b of the clutch spring 33 projects in a radial outward direction and is disposed in close juxtaposition with a stopper 40. The stopper 40 is composed of an annular or ring-shaped plate secured at its outer periphery to the inside surface of the housing 2. The ring-shaped stopper 40 is concentrical with the clutch spring 33 and has an inner peripheral edge located radially inwardly of the radial outward end extremity or tip of the lower end 33b of the clutch spring 33. A compression coil spring 24 is disposed between the guide shaft 36 and the drive shaft member 5 to keep the drive shaft member 5 and the output shaft member 7 away from each other with a given space defined therebetween as long as no thrusting force is applied.

The power screwdriver of the foregoing construction will operates as follows. After a screw 25 is sat on a bit 15 of the screwdriver, a non-illustrated motor is driven to rotate the drive shaft member 5 in the forward direction (rotation in the right-hand or clockwise direction). As the housing 2 of the screwdriver is thrust toward a tightened material, the output shaft member 7 moves relatively to the drive shaft member 5 in the upward direction in FIG. 7 against the force of the compression spring 24. A further upward movement of the output shaft member 7 causes the projection 35 to engage the lower end 33b of the clutch spring 33 while revolving together with the drive shaft member 5 whereupon the clutch spring 33 is tightened and thereby grips the outer peripheral surface 39 of the sleeve S3 with the result that the rotational force from the drive shaft member 5 is transmitted via the sleeve S5 and the guide shaft 36 to the screw 25. When the screw 25 is fed or driven to a predetermined tightening depth, the stopper sleeve 3 comes into abutment with the tightened material. In response to this abutment, the output shaft member 7 is forced downwardly in FIG. 7 by the force of the compression spring 24. However, owing to a frictional force acting between the projection 35 and the clutch spring 33, the clutch spring 33 and the projection 35 tend to further continue their downward movement while keeping interlocking engagement therebetween.

In this instance, by virtue of a step formed due to the difference in diameter between the drive shaft cylindrical outside surface 31 and the outer peripheral surface 39 of the sleeve S3 of the power transmission member 37, the clutch spring 33 is held in a floating condition over the step. Under such condition, the clutch spring 33 exhibits the characteristic of a weak tension spring. A further downward movement of the clutch spring 33 together with the projection 35 causes the lower end 33b of the clutch spring 33 engage the stopper 40. With this engagement, a further downward movement of the lower end 33b of the clutch spring 33 is prohibited, so that a grip on the outer peripheral surface 39 of the sleeve S3 is released. Thus, the output shaft member 7 alone is further displaced downwardly. When the clutch spring 33 releases the sleeve S3, the screw tightening operation is completed whereupon the stretched clutch spring 33 restores its original length. The foregoing operation of the clutch spring 33 ensures that the clutch engaging operation can be achieved silently with a highly uniform screw tightening accuracy. In order to reduce a frictional force acting between the projection 35 and the clutch spring 33, the projection 35 may be tapered or may include a ball partly embedded therein.

Figure 9:
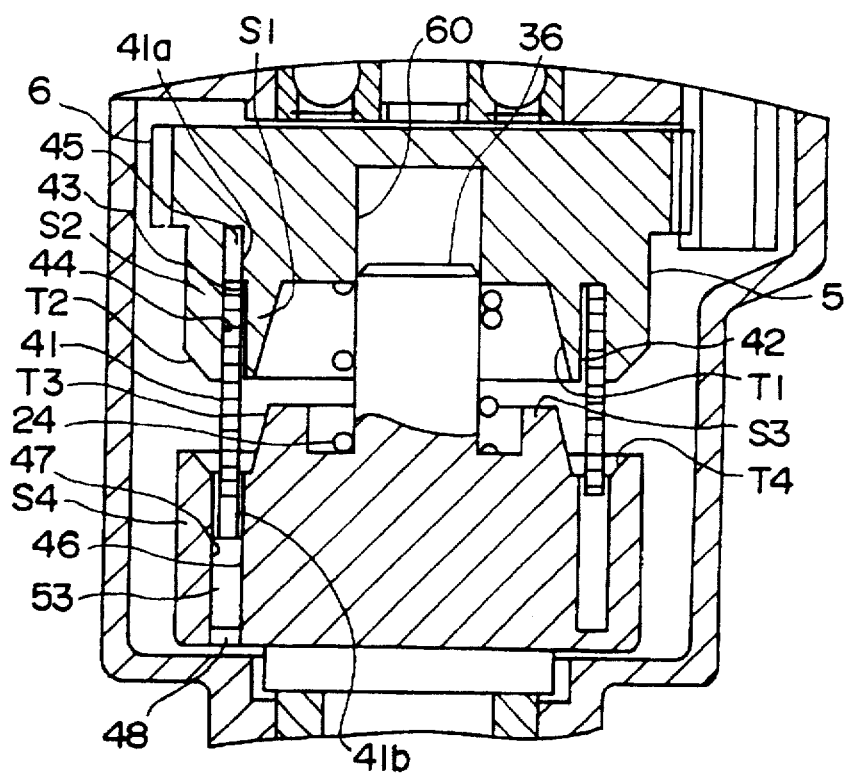
FIG. 9 is a fragmentary cross-sectional view showing a fourth embodiment of the power screwdriver according to the present invention.

FIG. 9 shows in cross section a fourth embodiment of the power screwdriver according to the present invention. A drive shaft member 5 includes inner and outer sleeves S1 and S2 extending concentrically so as to define therebetween an annular drive shaft groove 42 in which an upper portion of a forward/reverse clutch spring 41 is received. The drive shaft groove 42 is defined between a drive shaft first cylindrical inside surface 44 formed by an inner peripheral surface of the outer sleeve S2 and a drive shaft second cylindrical outside surface 43 formed by an outer peripheral surface of the inner sleeve S1. The inner and outer sleeves S1 and S2 have one end portion facing an output shaft member 7 and shaped into taper portions T1 and T2, respectively. The bottom (upper end in FIG. 9) of the drive shaft groove 42 is formed with an axial groove 45 in which an upper end 41a is permanently locked. The drive shaft groove 42 has a width slightly greater than the thickness of a wire used for forming the forward/reverse clutch spring 41. The wire of the forward/reverse clutch spring 41 has a rectangular cross section. The forward/reverse clutch spring 41 doubles in function as a clutch spring for conducting rotational driving in the forward direction and also as a clutch spring for conducting rotational driving in the reverse direction. The forward/reverse clutch spring 41 has the same construction as a clutch spring described later on and shown in FIG. 17.

The output shaft member 7 also has formed therein an annular output shaft groove 53 axially aligned with and facing toward the drive shaft groove 42. The output shaft groove 53 receives therein a lower portion of the forward/reverse clutch spring 41 with a slight gap or clearance provided therebetween. More specifically, the output shaft member 7 has two concentrically disposed sleeves S3 and S4. The output shaft groove 53 is defined between an output shaft first cylindrical inside surface 47 formed by an inner peripheral surface of the outer sleeve S4 and an output shaft second cylindrical outside surface 46 formed by an outer peripheral surface of the inner sleeve S3. The inner and outer sleeves S3, S4 have an end portion facing the drive shaft 5 and shaped into taper portions T3 and T4, respectively. The bottom of the output shaft groove 53 is formed with an axial latch groove 48.

The output shaft member 7 has a central guide shaft 36 axially slidably fitted in a central hole 60 in the drive shaft member 5. A compression spring 24 is disposed around the guide shaft 36 and acts between the drive shaft member 5 and the output shaft member 7. The power screwdriver thus constructed according to the fourth embodiment of the present invention is able to perform both of the screw tightening operation and the screw loosening operation via a single forward/reverse clutch spring 41. In the screw tightening operation, the drive shaft member 5 and the forward/reverse clutch spring 41 rotate in unison with each other, and a screw is attached to a bit (neither shown but identical to those shown in FIG. 1). Then, as the screw is forced against a tightened material, the taper portions T1 and T2 of the drive shaft member 5 are brought into fitting engagement with the taper portions T3 and T4 of the output shaft member 7, respectively. In addition, the lower end 41b of the forward/reverse clutch spring 41 is latched or caught in the latch groove 48 whereupon the forward/reverse clutch spring 41 is tightened and thereby grips the drive shaft second cylindrical outside surface 43 and the output shaft second cylindrical outside surface 46. Thus, a rotational force from the drive shaft member 5 is transmitted via the forward/reverse a clutch spring 41 to the output shaft member 7.

When the screw being driven reaches a predetermined tightening depth, the output shaft member 7 is forced downward in FIG. 9 by the force of the compression spring 24. In this instance, the forward/reverse clutch spring 41 acts as an axial tension spring, and subsequently it is slightly pulled toward the output shaft member 7 due to a frictional force acting between the lower end 41b and the latch groove 48. The forward/reverse clutch spring 41 thus stretched is thereafter released from the latch groove 48 whereupon it restores its original length. Since the lower end 41b of the forward/reverse clutch spring 41 is normally spaced from the latch groove 48, the clutch engaging and disengaging operation can be achieved silently. Furthermore, the clutch mechanism is compact in size and hence relatively inexpensive to manufacture. The wire of the forward/reverse clutch spring 41 may be rectangular or oval in cross section. In order to facilitate smooth disengagement between the lower end 41b of the forward/reverse clutch spring 41 and the latch groove 48, the latch groove 48 may be tapered or associated with a partly projecting ball.

Operation in the reverse rotation mode of the fourth embodiment, i.e., the screw loosening operation will be described below.

The drive shaft member 5 and the forward/reverse clutch spring 41 while rotating in the reverse direction (left-hand or counterclockwise direction) are displaced toward the output shaft member 7. Continuing this movement causes the lower end 41b of the forward/reverse clutch spring 41 to move into and hence get latched in the latch groove 48 whereupon the forward/reverse clutch spring 41 is subjected to a force tending to loosen and hence radially expand the forward/reverse clutch spring 41. The thus distorted forward/reverse clutch spring 41 is then forced into pressure contact with the inner peripheral surface (drive shaft first cylindrical inside surface 44) of the outer sleeve S2 of the drive shaft member 5 and the inner peripheral surface (output shaft first cylindrical inside surface 47) of the sleeve S4 of the output shaft member 7. Thus, the rotational force is transmitted from the drive shaft member 5 to the output shaft member 7 via the forward/reverse clutch spring 41.

As the screw is loosened, the output shaft member 7 moves upward and then reaches a predetermined position whereupon the forward/reverse clutch spring 41 is subjected to a tension and, owing to this tension, the lower end 41b of the forward/reverse clutch spring 41 is detached from the latch groove 48. Thus, transmission of force from the drive shaft member 5 to the output shaft member 7 is interrupted. The clutch cut off operation can be effected in a silent manner.

Figure 10:
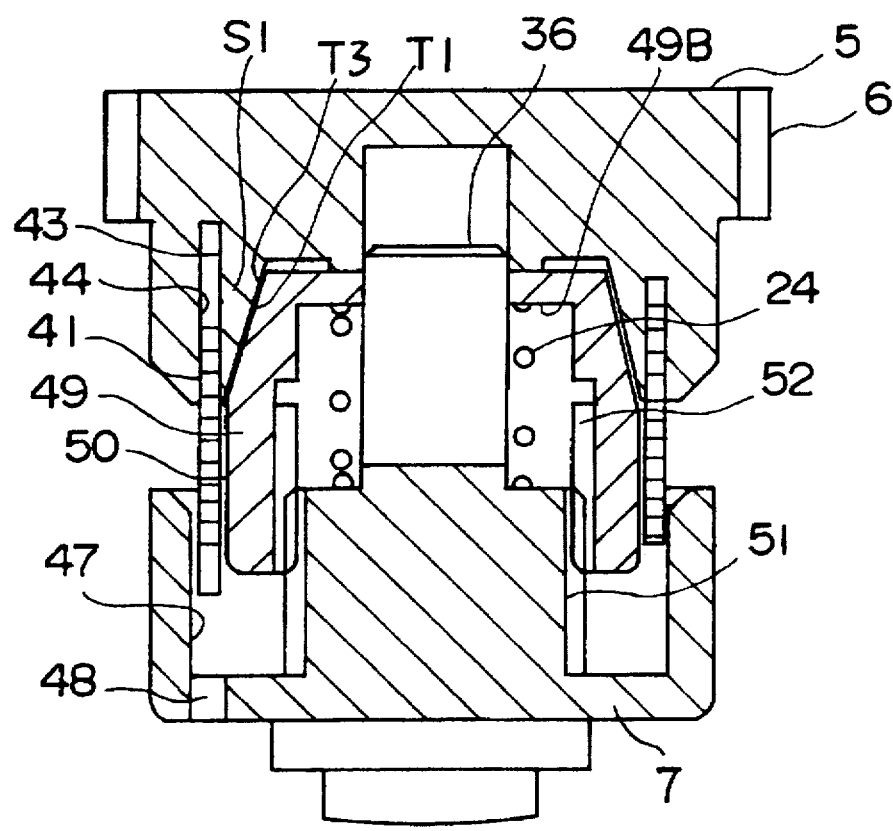
FIG. 10 is a fragmentary cross-sectional view showing a fifth embodiment of the power screwdriver according to the present invention.

FIG. 10 shows in cross section a fifth embodiment of the power screwdriver according to the present invention. The fifth embodiment is a variant of the fourth embodiment and have the same drive shaft member 5 as the fourth embodiment. In place of the integral sleeve S3 in the fourth embodiment, the output shaft member 7 in the fifth embodiment is provided with a slide sleeve 49 slidably movable relative to the output shaft member 7 in the axial direction thereof. The output shaft member 7 has a plurality of splines 51 which are held in mesh with mating splines 52 in an inner peripheral surface of the slide sleeve 49. At an upper end portion of the slide sleeve 49, the outer peripheral surface of the slide sleeve 49 is tapered as at T3. The taper portion T3 is fitted with the taper portion T1 of the drive shaft member 5. The sleeve 49 has a cup-like shape open downward and is urged toward the drive shaft member 5 by means of a compression spring 24 disposed around a guide shaft 36 of the output shaft member 7 and acting between the output shaft member 7 and an upper end wall (or bottom wall) 49B of the cup-shaped sleeve 49 to such an extent that the taper portion T3 of the sleeve 49 comes into fitting engagement with the taper portion T1 of the drive shaft member 5.

The power screwdriver constructed according the fifth embodiment will operate as follows.

In the screw tightening operation, the drive shaft member 5 and the forward/reverse clutch spring 41 while rotating in the forward direction (right-hand or clockwise direction) are advanced toward the output shaft member 7. As the advancing movement continues, the lower end 41b of the forward/reverse clutch spring 41 is caught or latched in the latch groove 48 whereupon the forward/reverse clutch spring 41 is tightened and thereby grips the outer peripheral surface (drive shaft second cylindrical outside surface 43) of the sleeve S1 of the drive shaft member 5 and the outer peripheral surface 50 of the sleeve 49, thereby transmitting a rotational force from the drive shaft member 5 to the output shaft member 7. Since the sleeve 49 is commented by a spline coupling 51, 52 with the output shaft member 7, the output shaft member 7 is rotated immediately upon rotation of the sleeve 49.

When the output shaft member 7 while advanced toward the tightened material arrives at a predetermined position, the forward/reverse clutch spring 41 is subjected to a tension as in the same manner as the previously described in the fourth embodiment. Owing to the spline coupling 51, 52, the output shaft member 7 is readily movable in the downward direction in FIG. 10 by the force of the compression spring 24 and, hence, the lower end 41b off the forward/reverse clutch spring 41 can be smoothly detached from the latch groove 48. The spline coupling may be replaced by a key coupling or a ball spline coupling. It is further possible to provide a step at the interface between the drive shaft second cylindrical outside surface 43 and the outer peripheral surface 50 of the sleeve 49 in the same manner as done in the third embodiment shown in FIG. 8, in order to provide a further reduction of the operation noise. Operation in the reverse rotation mode, i.e., the screw loosening operation can be achieved in the same manner as done in the previously described fourth embodiment, and the same degree of noise reduction effect can be attained during the clutch out-off operation.

Description will be given of sixth to ninth embodiments of the power screwdriver according to the present invention. These embodiments differ from the first to fifth embodiments in that one end of a coiled clutch spring adapted to be releasably locked is locked and released by a ball which is mounted on a sleeve and movable in a radial direction, as will become apparent from the follow description.

Figure 11:
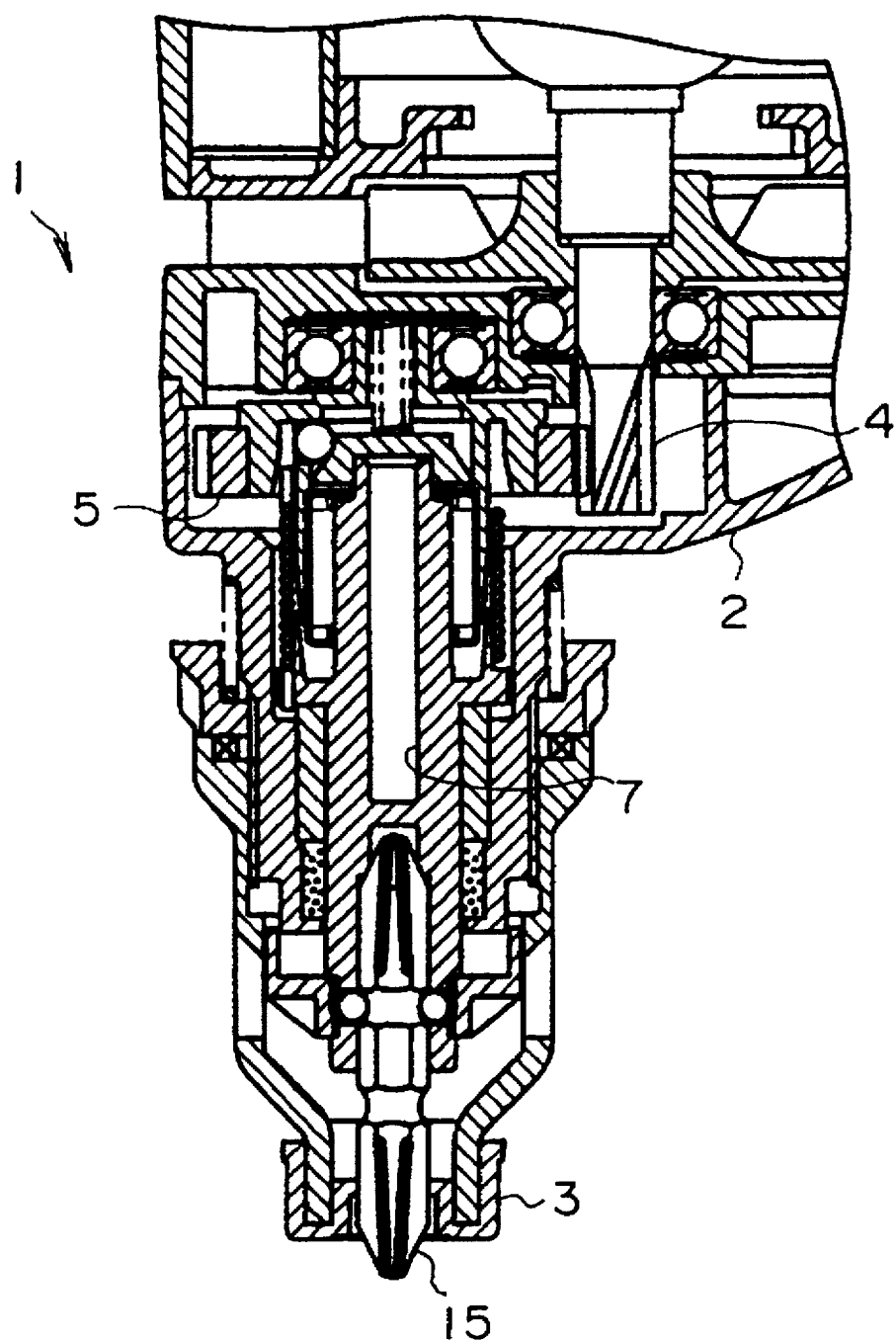
FIG. 11 is a fragmentary cross-sectional view showing a sixth embodiment of the power screwdriver according to the present invention.
Figure 12:
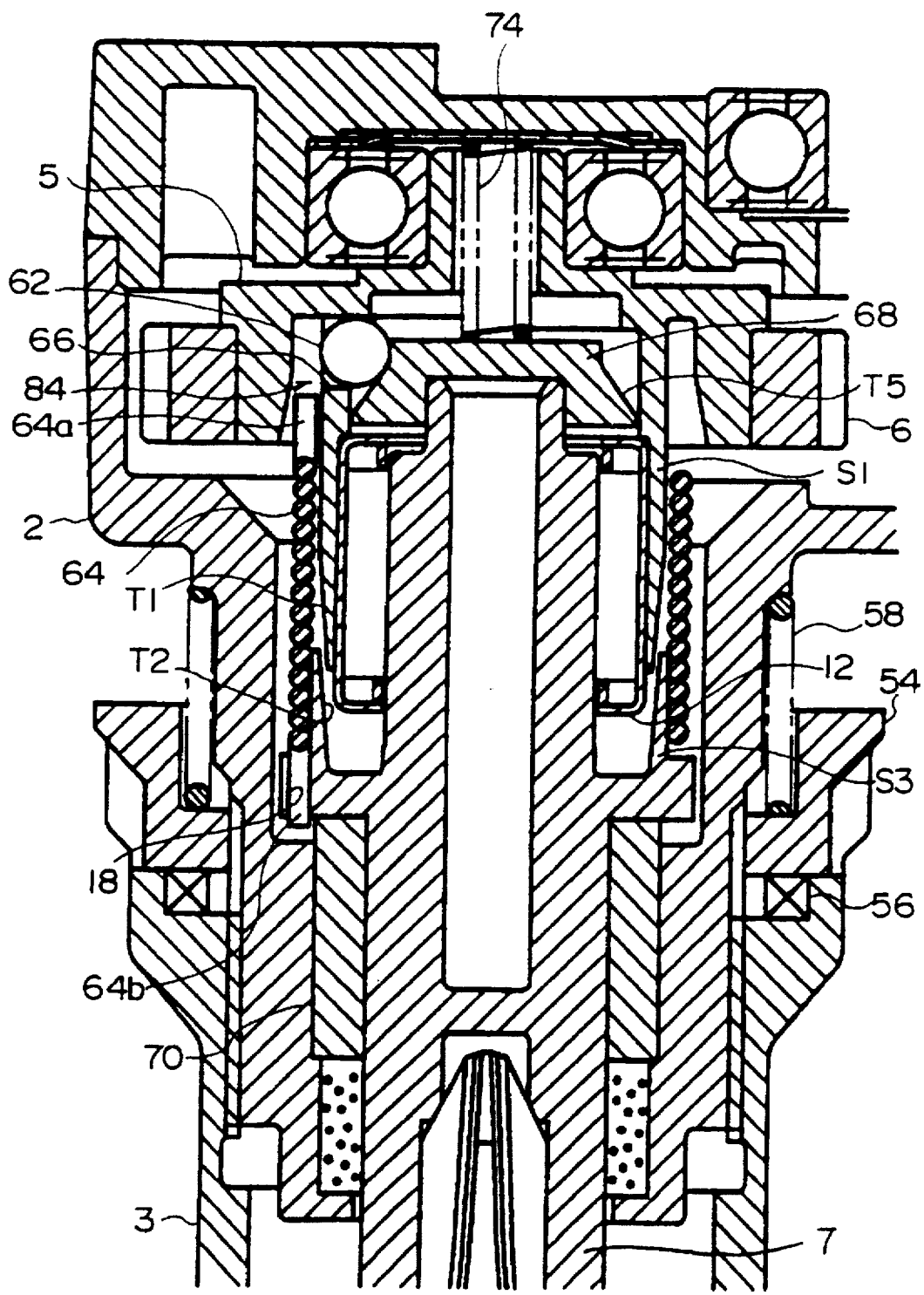
FIG. 12 is an enlarged cross-sectional view of a portion of the sixth embodiment.
Figure 17:
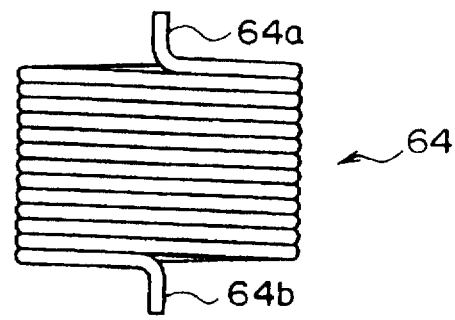
FIG. 17 is a front elevational view of a left hand wind clutch spring used in the sixth to ninth embodiments of the present invention.

FIG. 11 shows in cross section a sixth embodiment of the power screwdriver according to the present invention, and FIG. 12 is an enlarged view of a portion of FIG. 11. The sixth embodiment may be said as a variant of the first embodiment shown in FIG. 1 and, hence, like or corresponding parts are designated by the same reference characters. Although the clutch spring 16 used in the first embodiment is locked at its upper end by the action of a frictional force exerted by the shoe 8, the upper end of a clutch spring 64 used in the sixth embodiment is locked by a steel ball (simply referred to as "ball") 62 associated with a drive shaft member 5. The drive shaft member 5 includes a sleeve S1 having defined therein an internal space in which a one-way clutch 12 is mounted. An output shaft member 7 includes a sleeve S3. The sleeves S1 and S3 have complementary or mating taper portions T1 and T2, respectively. The clutch spring 64 used in this embodiment is composed of a tightly wound left hand coil spring with opposite ends (upper and lower ends) 64a and 64b projecting axially outwardly in opposite directions, as shown in FIG. 17. This clutch spring 54 is used in all the embodiments described later on. A housing 2 of the screw driver includes a metal member or bushing 70 fitted around a portion of the output shaft member 7.

In FIG. 11, a stopper sleeve 3 is threaded over a head portion (lower portion in the same figure) of the housing 2, so that by turning or rotating the stopper sleeve 3, the stopper sleeve 3 is movable relative to the housing 2 in the axial direction thereof. As shown in FIG. 12, a lock member 54 is mounted on the housing 2 at a position immediately above the stopper sleeve 3 in such a manner that the lock member 54 is non-rotatable about the housing 2 but slidable in the axial direction. The lock member 54 is urged downward toward the stopper sleeve 3 by means of a compression spring 58. The stopper sleeve 3 and the lock member 54 are normally engaged together via meshing engagement between teeth 56 on the stopper sleeve 3 and teeth 56 on the lock member 54. Thus, when engaged with the lock member 54, the stopper sleeve 3 is not rotatable and set in a predetermined axial position. When the screw tightening depth (screw feed distance) is to be changed, the operator displaces the lock member 54 upwardly against the force of the compression spring 58 to disengage the teeth 56 on the lock member 54 from the teeth 56 on the stopper sleeve 3. Then, while keeping this condition, the operator rotates the stopper sleeve 3 in a desired direction to move the same in an axial direction until a desired position of the stopper sleeve 3 is obtained.

The ball 62 is received in a through-hole 66 extending radially across the wall of the sleeve S1 and is movable in the radial direction between a first position in which the ball 62 is retracted from the outer peripheral surface of the sleeve S1, and a second position in which the ball 62 is partly projecting from the outer peripheral surface of the sleeve S1. A frustrum-like pusher member 68 is slidably received in the sleeve S1 and slidable along the axis of the sleeve S1. The frustrum-like pusher member 68 has an undersurface (in FIG. 12) facing the output shaft member 7 and engageable with an upper end of the output shaft member 7. The sleeve S3 of the output shaft member 7 has formed therein an axial groove 18 in which a lower end 64b of the clutch spring 64 is permanently locked in the same manner as described in the first embodiment.

Figure 13:
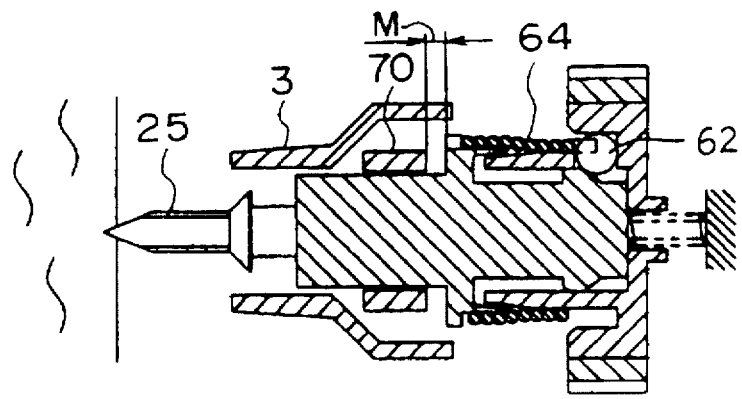
FIGS. 13(a) through 13(d) are schematic cross-sectional views, with parts omitted for clarity, showing a sequence of operations of the sixth embodiment.
Figure 13:
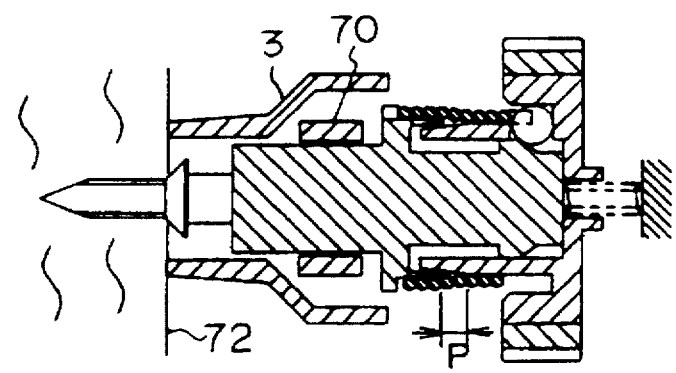
Figure 13:
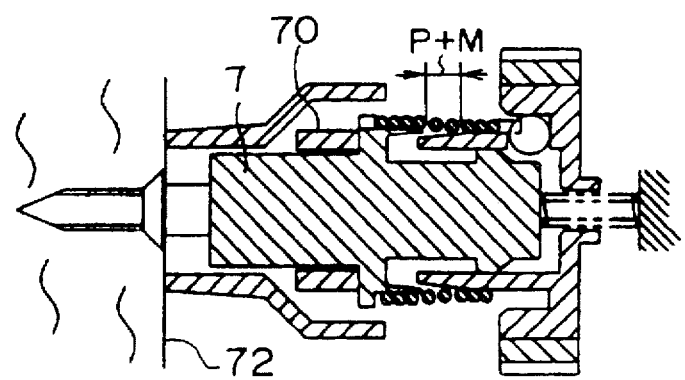
Figure 13:
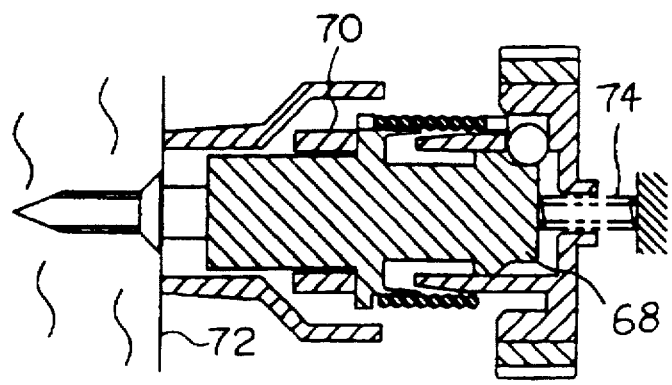

FIGS. 13(a) through 13(d) diagrammatically illustrate a sequence of operations of the screwdriver according to the sixth embodiment. When a screw 25 is to be tightened to a tightened material 72, the drive shaft member 5 while rotating in the forward direction is relatively moved toward the output shaft member 7. As a result of this relative movement, the frustrum-like pusher member 68 forces the ball 62 in a radial outward direction, as shown in FIG. 13(a), by the action of a taper portion or conical surface T5 (FIG. 12) of the frustrum-like pusher member 68. In this instance (at the start of the screw tightening operation), a predetermined portion of the output shaft member 7 and an end of the metal member 70 facing toward the drive shaft member 5 are spaced by a distance M. As the ball 62 partly projects from the outer peripheral surface of the sleeve S1, the upper end 64a of the clutch spring 64 is caught by the ball 62 whereupon the clutch spring 64 is tightened and thereby grips the respective outer peripheral surfaces of the sleeves S1 and S3, thereby transmitting the rotational force from the drive shaft member 5 to the output shaft member 7 in the same manner as done in the first embodiment. Since the sleeve S3 has an outside diameter slightly greater than the outside diameter of the sleeve S1, a longitudinal central portion of the clutch spring 64 does not take part in the gripping of the sleeves S1 and S3, this portion (non-gripping portion) has a length P (FIG. 13(b)). As the screw tightening operation proceeds, the stopper sleeve 3 comes into contact with the tightened material 72, as shown in FIG. 13(b). In this instance, the head of the screw 25 is spaced from the surface of the tightened material 72 by a distance M.

A reaction force from the tightened material, which is produced in response to a thrust exerted on the screwdriver, is retained by the stopper sleeve 3, and after that as shown in FIG. 13(c), the output shaft member 7 further advances toward the tightened material 72 until it abuts on the end of the metal member 70. In this instance, the head of the screw 25 lies flush with the surface of the tightened material 72, as shown in FIG. 13(c). As the screw tightening operation advances from the condition shown in FIG. 13(b) to the condition shown in FIG. 13(c), the output shaft member 7 advances toward the tightened material 72 by the distance M with the result that the non-gripping portion of the clutch spring 64 has an axial length P+M. When the screw 25 is tightly fastened to the tightened material 72, the frustrum-like pusher member 68 is displaced toward the tightened material 72 by the force of a compression spring 74 acting between the drive shaft member 5 and the output shaft member 7 via the frustrum-like pusher member 68. This movement of the frustrum-like pusher member 68 allows the ball 62 to retract into the sleeve S1 by a radial inward force exerted thereon from the upper end 64a of the clutch spring 64. Simultaneously with this retracting movement of the ball 62, the upper end 64a of the clutch spring 64 is released from interlocked engagement with the ball 62 whereupon the clutch spring 64 ceases from gripping the sleeves S1 and S3. The clutch spring 64 immediately returns, by its own resiliency, to the initial condition (see FIGS. 11 and 12), i.e., the condition before the start of the screw tightening operation. In this condition, the upper end 64a of the clutch spring 64 and the ball 62 are spaced apart by a space 84.

The ball 62, as it is received in the drive shaft member 5, is subjected to a centrifugal force related to its own weight while the drive shaft member 5 is rotating. Accordingly, while the drive shaft member 5 is rotating, the ball 62 is normally placed, by the centrifugal force, in a condition in which a portion of the ball 62 projects from the outer peripheral surface of the sleeve S1. Under such condition, i.e., in the condition where the ball 62 partly projects radially outwardly from the sleeve S1, as long as the output shaft member 7 is not forced toward the tightened material 72, the clutch spring 7 does never act to grip the drive shaft member 8 due to the space 84 provided between the upper end 64a of the clutch spring 64 and the ball 62. Thus, transmission of the rotational force from the drive shaft member 5 to the output shaft member 7 does not take place. As the output shaft member 7 is forced toward the tightened material 72, the output shaft member 7 and the drive shaft member 5 relatively move toward each other. And when the axial displacement of the output shaft member 7 relatively to the drive shaft member 5 exceeds an axial extent of the space 84, the upper end 64a of the clutch spring 64 is engaged or caught by the ball 62, whereupon the clutch spring 64 is tightened and thereby grips the drive shaft member 5, thus enabling transmission of the rotational force from the drive shaft member 5 to the output shaft member 7.

While the foregoing transmission of rotational force continues, engagement between the ball 62 and the upper end 64a of the clutch spring 64 takes place in such a manner that the central axis of the axially projecting upper end 64a of the clutch spring 64 is offset in a radial outward direction from a centerline of the ball 62 extending parallel to the axis of the drive shaft member 5. With this engagement, the ball 62 is able to continuously receive, from the clutch spring upper end 64a, a component force acting at a contact point in a radial inward direction and hence tending to move the ball 62 into the sleeve S1. In the case where the drive shaft member 5 As rotating at a higher speed, the ball 62 is subjected to a greater centrifugal force which will acts in a direction to strengthen or tighten the engagement between the ball 62 and the clutch spring upper end 64a. Even at such high speed rotation, however, a clutch releasing or disengaging operation can be achieved smoothly and reliably because, owing to a round surface of the ball 62, the upper end 64a of the clutch spring 64 readily slips down the round surface of the ball 62 and separates from the ball 62 as soon as the ball 62 is sightly displaced in the radial inward direction by the clutch spring upper end 64a at the beginning of the clutch releasing operation.

The sixth embodiment shown in FIG. 12 differs from the first embodiment of FIG. 1 in that the one-way clutch 12 is assembled with the output shaft member 7 as a built-in component of the latter since the inner peripheral surface of the one-way clutch 12 is directly and slidably fitted around a cylindrical portion of the output shaft member 7. As opposed to this arrangement, the one-way clutch 12 in the first embodiment shown in FIG. 1 is mounted on the output shaft member 7 via the hollow cylindrical slider 23 which is fitted in a central hole defined by the inner peripheral surface of the one-way clutch 12 and has, formed in its inner peripheral surface, splines 17 held in mesh with splines 22 on the guide shaft 21 of the output shaft member 7. The arrangement shown in FIG. 1 is more complicated in construction than the arrangement shown in FIG. 12, but it is contributive to elongation of the service line of the screwdriver because sliding movement between the output shaft member 7 and the drive shaft member 5 can be taken smoothly with least frictional resistance. Such a highly smooth sliding movement brings about a corresponding reduction of force or thrust required of the operator to force the housing 2 toward the tightened material. From this point of view, a preferred modification of the arrangement shown in FIG. 12 may include a slider like the slider 23 shown in FIG. 1.

Figure 14:
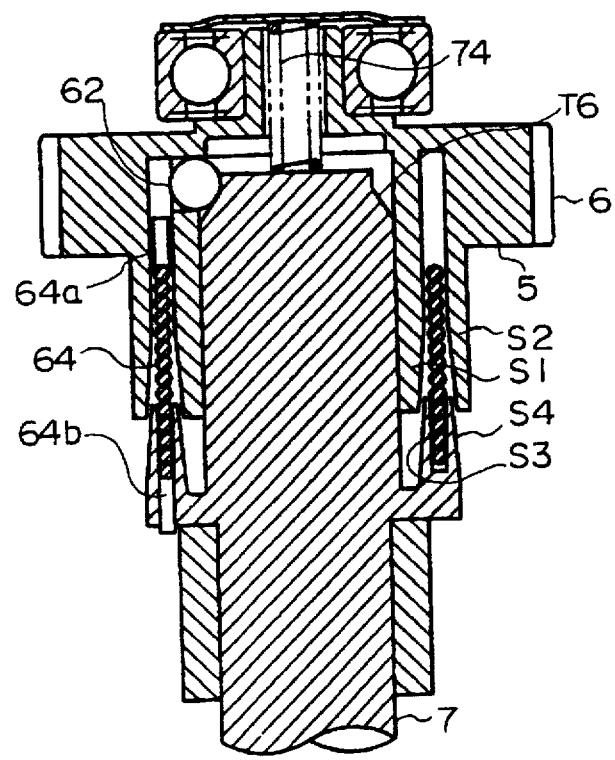
FIG. 14 is a fragmentary cross-sectional view showing a seventh embodiment of the power screwdriver according to the present invention.

Then, a seventh embodiment of the present invention will be described below with reference to FIG. 14. The seventh embodiment may be said as a variant of the fourth embodiment shown in FIG. 9 in that a clutch spring 64 is used for the rotational driving in both forward and reverse directions. By the use of the spring clutch 64, the one-way clutch 12 used in the sixth embodiment shown in FIG. 12 can be omitted. As a result of this omission, the frustrum-like pusher member 68 used in the sixth embodiment of FIG. 12 can be also omitted, and a compression coil spring 74 has one end directly acting on the upper end of a output shaft member 7. As an substitution for the taper portion T3 of the omitted frustrum-like pusher member 68, an upper end portion of the output shaft member 7 is so profiled as to provide a taper portion T6. The taper portion T6 is engageable with a ball 62 to displace the same in a radial outward direction. In the seventh embodiment shown in FIG. 14, these parts which are the same as, or corresponding to, those employed in the fourth and sixth embodiments shown respectively in FIG. 9 and FIG. 12 are designated by the same or corresponding reference characters.

Figure 15:
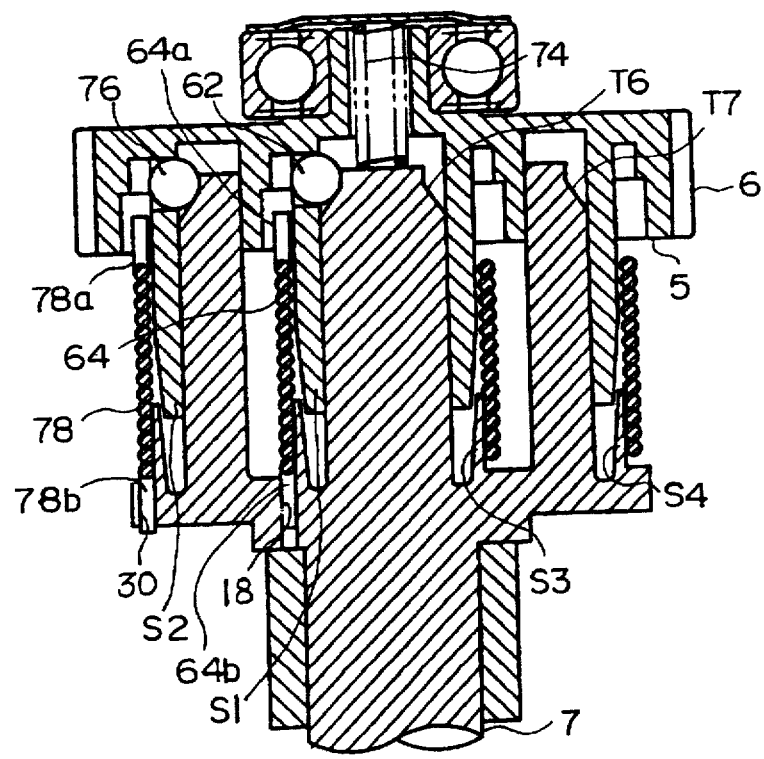
FIG. 15 is a fragmentary cross-sectional view showing an eighth embodiment of the power screwdriver according to the present invention.
Figure 18:
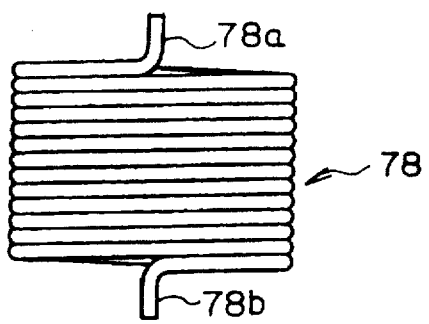
FIG. 18 is a front elevational view of a right hand wind clutch spring used in the eighth and ninth embodiments of the present invention.

Referring now to FIG. 15, there is shown an eighth embodiment of the present invention, which may be also considered as a variant of the second embodiment of FIG. 5 in that a forward rotation clutch spring 64 and a reverse rotation clutch spring 78 are disposed in concentrical relation. The forward rotation clutch spring 64 is adapted to be tightened and thereby grip one pair of confronting sleeves S1 and S3 in the same manner as the sixth embodiment previously described for the purpose of transmission of torque in the forward direction. The reverse rotation clutch spring 78 is composed of a tightly wound right hand coil spring, as shown in FIG. 18. The reverse rotation clutch spring 78 is, therefore, tightened and thereby grips another pair of confronting sleeves S2 and S4 while rotating in the reverse direction. Thus, the reverse rotation clutch spring 78 is used exclusively for the transmission of torque in the reverse direction. Opposite ends of the reverse rotation clutch spring 78 each projects in an axial outward direction. The lower end 78b of the reverse rotation clutch spring 78 is permanently locked in an axial groove 30 in the sleeve S4 of the output shaft member 7, while the upper end 78a is latched or caught by a radially movable ball 76 when the ball 78 partly projects from the outer peripheral surface of the sleeve S2 of the drive shaft member 5.

The output shaft member 7 has a taper portion T7 engageable with the ball 76 to displace the came in a radial outward direction, and a taper portion T6 concentrical with the taper portion T7 and engageable with a ball 62 to displace the same in a radial outward direction. Although in the second embodiment shown in FIG. 5, the forward rotation clutch spring 16 is disposed outwardly of the reverse rotation clutch spring 27, this positional relationship between the forward and reverse clutch springs is reversed in the eighth embodiment shown in FIG. 15. In the eighth embodiment, these parts which are identical with or corresponding to those in the second embodiment of FIG. 5 or in the sixth embodiment of FIG. 12 are designated by the same or corresponding reference characters, and no further description of the same are needed.

Figure 16:
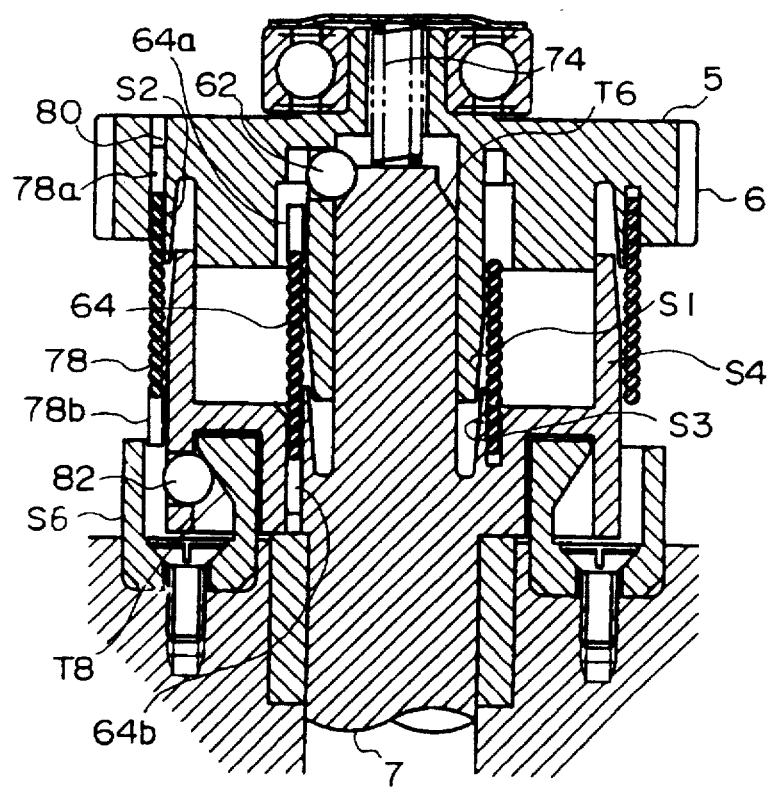
FIG. 16 is a fragmentary cross-sectional view showing a ninth embodiment of the power screwdriver according to the present invention.

FIG. 16 shows in cross section a ninth embodiment of the present invention. This embodiment may be said as a variant of the eighth embodiment shown in FIG. 18 in that a forward rotation clutch spring 64 and a reverse rotation clutch spring 78 are disposed in concentrical relation with each other. One difference from the eighth embodiment is that the position of a locked end of the reverse rotation clutch spring 78 is inverted in the axial direction of the clutch spring 78. More specifically, an upper end 78a of the reverse rotation clutch spring 78 is permanently locked in an axial groove 80 formed in a drive shaft member 5, while a ball 82 for temporarily Locking a lower end 78b of the reverse clutch spring 78 is radially movably mounted on a sleeve S4 of an output shaft member 7.

The shape and size of the sleeves S2 and S4 in the ninth embodiment shown in FIG. 16 are related in reverse to those of the sleeves S2 and 84 in the eighth embodiment of FIG. 15. Furthermore, on the tightened material side of the sleeve S4, there is an additional sleeve S6 coupled by a suitable means with the drive shaft member 5 and having a taper portion T8 engageable with the ball 82. When the drive shaft member 5 is relatively displaced toward the output shaft member 7, the taper portion T8 comes in contact with the ball 82 and subsequently forces the ball 82 in the radial outward direction. In FIG. 16 these parts which are like or corresponding to those in the eighth embodiment of FIG. 15 are designated by the same reference characters end further description about them will be omitted. It will be understood from the eighth and ninth embodiments described above that the locked or secured end of each clutch spring 64, 78 may be located either at the drive shaft member 5 side or alternatively at the output shaft member 7 side.

In the sixth to ninth embodiments a ball is used for temporarily locking one end of each clutch spring. Such a temporarily locking means as represented by the ball should by no means be limited to a spherical member but may include a generally rod-like member movable in the axial direction aligned with the radial direction of the sleeve and having a round end portion adapted to be projected from the sleeve for interlocking engagement with the one clutch spring end. In each of the foregoing embodiments, transmission of a torque is attained either by tightening a coiled clutch spring around the respective outer peripheral surfaces of one pair of confronting sleeves, or by loosening a coiled clutch spring and thereby forcing the clutch spring against the respective inner peripheral surfaces of one pair of confronting sleeves. In the case where the clutch spring firmly winds on and grips the outer peripheral surfaces of the sleeves, the sleeves should by no means be limited to a hollow construction but may be composed of a solid cylinder. Accordingly, the term "sleeve" is used herein in a comprehensive sense, i.e., to broadly refer to cylindrical members including a solid cylinder, except when the cylindrical member is used in combination with a clutch spring which is active when it is radially expanded and forced against the inner peripheral surface.

As described above, a power screwdriver according to the present invention includes a clutch mechanism composed of a coil spring capable of connecting and disconnecting a drive shaft member and an output shaft member. When the clutch is engaged, the coil spring grips the drive shaft member and the output shaft member to transmit a torque from the former to the latter. With this arrangement, the clutch can be engaged without impact blow or shock, and the operation noise and an initial thrusting force required of the operator for initiating the clutch engaging operation can be greatly reduced. When the clutch is disengaged, the coil spring ceases from gripping the two shaft members. Thus, the clutch disengaging operation can be also achieved smoothly and silently without accompanying impact blow or shock. In the screw loosening operation, namely, in the reverse rotation mode, torque transmission can be attained either by radially contracting the coil spring to grip the respective outer cylindrical surfaces of the drive and output shaft members, or by radially expanding the coil spring to catch the respective cylindrical inside surfaces of the drive and output shaft members. Thus, the same advantageous effects as attained in the forward rotation mode can be obtained also in the reverse rotation mode.

Obviously, various modifications and variations of the present invention are possible in the light of the above teaching. It is therefore to be understood that within the scope of the appended claims the invention may be practiced otherwise than as specifically described.

What is claimed is:

1. A power screwdriver of the type including a drive shaft member for transmitting a power from a drive unit, an axially movably supported output shaft member holding a bit, and a compression spring urging said output shaft member and said drive shaft member away from each other, in which transmission of a rotational force from said drive shaft member to said output shaft member is interrupted according to a predetermined axial displacement of said output shaft member relative to said drive shaft member, wherein the improvement comprises:

a coiled clutch spring coaxial with said drive shaft member and said output shaft member and extending spirally over and along respective cylindrical surfaces of said drive shaft member and said output shaft member, said clutch spring having a portion firmly secured to one of said output shaft member and said drive shaft member; and means on the other of said output shaft member and said drive shaft member for locking a second portion of said clutch spring in response to the axial displacement of said output shaft member.

2. A power screwdriver according to claim 1, wherein said drive shaft member and said output shaft member have respective portions coaxial with and fitted with each other at least when the rotational force is being transmitted from said drive shaft member to said output shaft member.

3. A power screwdriver according to claim 1, wherein at lease one of said respective cylindrical surfaces of said drive shaft member and said output shaft member has an outside diameter smaller than the inside diameter of said coiled clutch spring.

4. A power screwdriver according to claim 1, wherein said means for locking said second portion of said clutch spring in response to the axial displacement of said output shaft member comprises a shoe provided on said other shaft member and having an inside surface complementary in contour to the shape of a portion of an outer peripheral surface of a cone.

5. A power screwdriver according to claim 4, wherein said inside surface of said shoe slopes with respect to a central axis of said drive shaft member at an angle in the range of 5 to 70 degrees.

6. A power screwdriver according to claim 5, wherein one of said drive shaft member and said output shaft member is provided with a one-way clutch operative while said drive shaft is rotating in the reverse direction to rotate said bit in the same direction, and the other of said drive shaft member and said output shaft member has a guide shaft supported at an inner peripheral surface portion of said one-way clutch.

7. A power screwdriver according to claim 6, further including a slider interconnecting said inner peripheral surface portion of said one-way clutch and said guide shaft, said guide shaft and said slider being rotatable in unison with each other and slidable relative to each other in the axial direction thereof.

8. A power screwdriver according to claim 4, further including a coiled reverse rotation clutch spring wound in the opposite direction to said coiled clutch spring and active while said drive shaft member is rotating in the reverse direction to rotate said bit in the same direction, said drive shaft member and said output shaft member further including respective reverse rotation cylindrical surfaces, said reverse rotation clutch spring being coaxial with, and extending spirally over and along, said respective reverse rotation cylindrical surfaces.

9. A power screwdriver according to claim 1, wherein one of said drive shaft member and said output shaft member includes a guide shaft, and a power transmission member rotatable in unison with said guide shaft and slidable relative to said guide shaft in the axial direction thereof for transmitting the rotational force to said output shaft member via said clutch spring, said power transmission member having a cylindrical surface forming said cylindrical surface of said one shaft member, and wherein said clutch spring is coaxial with, and extends spirally over and along, said cylindrical surface of said power transmission member and said cylindrical surface of said guide shaft member.

10. A power screwdriver according to claim 9, wherein said means for locking said second portion of said clutch spring is disposed on said output shaft member, and wherein said screwdriver further includes a housing in which said drive shaft member, said output shaft member, said compression spring and said clutch spring are received, said housing including a stopper for releasing locking engagement between said clutch spring and said locking means.

11. A power screwdriver according to claim 9, wherein said power transmission member and said guide shaft member are urged apart by a spring.

12. A power screwdriver according to claim 11, wherein one of said drive shaft member and said output shaft member is provided with a one-way clutch fixedly disposed at a position located radially inward of said cylindrical surface of said one shaft member, and said power transmission member has a sleeve supported at an inner peripheral surface portion of said one-way clutch.

13. A power screwdriver according to claim 12, wherein said cylindrical surface of said power transmission member and said cylindrical surface of said other shaft member have different outside diameters and jointly form at their interface a step when they are brought together in the axial direction thereof.

14. A power screwdriver according to claim 1, wherein said drive shaft member further has a cylindrical inside surface extending concentrically around said cylindrical surface so as to define therebetween an annular groove for receiving therein one end portion of said coiled clutch spring with a slight clearance therebetween, and said output shaft member further has a cylindrical inside surface extending around said cylindrical surface so as to define therebetween an annular groove for receiving the other end portion of said coiled clutch spring with a slight clearance therebetween, whereby while said drive shaft member is rotating in one direction, said coiled clutch spring is caused to radially contract and thereby grip said cylindrical surfaces of said drive shaft member and said output shaft member to undertake said transmission of the rotational force, and while said drive shaft member is rotating in the opposite direction, said coiled clutch spring is caused to radially expand and thereby catch said cylindrical inside surfaces of said drive shaft member and said output shaft member to undertake said transmission of the rotational force.

15. A power screwdriver according to claim 14, wherein one of said drive shaft member and said output shaft member includes a guide shaft, and a sleeve rotatable in unison with said guide shaft and slidable relative to said guide shaft in the axial direction thereof, said sleeve having an outer peripheral surface forming said cylindrical surface of said one shaft member.

16. A power screwdriver according to claim 1, wherein said other shaft member includes a cylindrical sleeve having an outer peripheral surface forming said cylindrical surface of said other shaft member, and a radial through-hole opening at one end to said outer peripheral surface of said sleeve, and wherein said means for locking said second portion of said coiled clutch spring according to the axial displacement of said output shaft member is composed of a ball movably received in said radial through-hole and partly projectable from said outer peripheral surface of said sleeve, and means for forcing said ball to project from said outer peripheral surface of said sleeve according to the axial displacement of said output shaft member.

17. A power screwdriver according to claim 16, wherein while the rotational force is not transmitted from said drive shaft member to said output shaft member, said second portion of said coiled clutch spring is separated from said ball in the axial direction with a space provided therebetween.

18. A power screwdriver of the type including a drive unit, a drive shaft member adapted to be rotated by said drive unit, an output shaft member capable of holding a bit, rotatable about its own axis and movable in the axial direction according to a screw tightening depth, a compression spring urging said output shaft member and said drive shaft member away from each other, clutch means for enabling and interrupting transmission of a rotational force from said drive shaft member to said output shaft member, and a housing containing said drive unit, said drive shaft member, said output shaft member, said compression spring and said clutch means, wherein the improvement comprises:

said drive shaft member and said output shaft member being coaxial with each other and having respective sleeves; and said clutch means including a coil spring engageable with respective outer peripheral surfaces of said sleeves of said drive shaft member and said output shaft member, means for firmly securing one end of said coil spring to one of said drive shaft member and said output shaft member, and locking means for locking the other end of said coil spring to the other of said drive shaft member and said output shaft member when said drive shaft member approaches said output shaft member against the force of said compression spring as said housing is thrust toward a material to which a screw is tightened.

19. A power screwdriver according to claim 18, wherein said drive shaft member and said output shaft member each includes a second sleeve concentrical with and extending around a corresponding one of said sleeves, and wherein said coil spring grips respective outer peripheral surfaces of said sleeves of said drive shaft member and said output shaft member while said drive shaft is rotating in the forward direction, and is forced into pressure contact with respective inner peripheral surfaces of said second sleeves of said drive shaft member and said output shaft member while said drive shaft member is rotating in the reverse direction.

20. A power screwdriver according to claim 19, wherein said locking means includes a radial through-hole formed in said sleeve of said other shaft member, a ball movably received in said radial through-hole and partly projectable from said outer peripheral surface of said sleeve, and means for forcing said ball to project form said outer peripheral surface of said sleeve in response to the axial movement of said output shaft member.

21. A power screwdriver according to claim 20, wherein while the rotational force is not transmitted from said drive shaft member to said output shaft member, said other end of said coal spring is separated from said ball in the axial direction with a space provided therebetween.

22. A power screwdriver according to claim 20, wherein said means for forcing said ball to project from said outer peripheral surface of said sleeve includes a pusher member having a taper portion engageable with said ball to force out the same from said sleeve as said output shaft member moves toward said drive shaft member.

23. A power screwdriver according to claim 22, further including a stopper means movable in the axial direction relative to said housing and engageable with the material to which the screw is tightened, said pusher member being arranged so that when said stopper means abuts on the material to which the screw is tightened, said pusher member is displaced in a direction away from said drive shaft member by the force of said compression spring.

24. A power screwdriver according to claim 18, wherein said drive shaft member and said output shaft member each includes a second sleeve concentrical with a corresponding one of said sleeves, and wherein said clutch means including a second coil spring wound in the opposite direction to said coil spring and engageable with respective outer peripheral surfaces of said second sleeves of said drive shaft member and said output shaft member, second means for firmly securing one end of said second coil spring to one of said drive shaft member and said output shaft member, and second locking means for locking the other end of said second coil spring to the other of said drive shaft member and said output shaft member when said drive shaft member relatively approaches said output shaft member against the force of said compression spring as said housing is thrust toward a material to which a screw is tightened.

25. A power screwdriver according to claim 24, wherein each of said locking means and said second locking means includes a radial through-hole formed in a corresponding one of said sleeve and said second sleeve of said other shaft member, a ball movably received in radial through-hole and partly projectable from said outer peripheral surface of said corresponding sleeve, and means for forcing said ball to project from said outer peripheral surface of said corresponding sleeve in response to the axial movement of said output shaft member.

26. A power screwdriver according to claim 25, wherein while the rotational force is not transmitted from said drive shaft member to said output shaft member, said other end of each of said coil spring and said second coil spring is separated from said ball in the axial direction with a space provided therebetween.

27. A power screwdriver according to claim 25, wherein said means for forcing said ball to project from said outer peripheral surface of said corresponding sleeve includes a pusher member having a taper portion engageable with said ball to force out the same from said corresponding sleeve as said output shaft member moves toward said drive shaft member.

28. A power screwdriver according to claim 27, further including a stopper means movable in the axial direction relative to said housing and engageable with the material to which the screw is tightened, said pusher member being arranged so that when said stopper means abuts on the material to which the screw is tightened, said pusher member is displaced in a direction away from said drive shaft member by the force of said compression spring.

29. A clutch mechanism comprising:

a drive shaft member rotatable by a drive unit and having a first cylindrical sleeve;

an output shaft member coaxial with said drive shaft member, rotatable about its own axis, movable in the axial direction toward and away from said drive shaft member, and having a second cylindrical sleeve substantially aligned with said first sleeve;

compression spring urging said drive shaft member and said output shaft member away from each other;

a coil spring disposed along respective outer peripheral surfaces or respective inner peripheral surfaces of said first and second sleeves and having one end secured to one of said drive shaft member and said output shaft member; and locking means for temporarily locking the other end of said coil spring to the other of said first and second sleeves when the distance between said drive shaft member and said output shaft member falls below a predetermined value as said output member is displaced toward said drive shaft member against the force of said compression spring, thereby causing said coil spring to radially contract or expand according to the direction of rotation of said drive shaft member to catch the outer peripheral surfaces or the inner peripheral surfaces of said first and second sleeves of said drive shaft member and said output shaft member to transmit a rotational force from said drive shaft member to said output shaft member.

30. A clutch mechanism according to claim 29, further including means for releasing locking engagement between said other end of said coil spring and said lock means when said output shaft member is displaced away from said drive shaft member by a predetermined distance.

* * * * *